Nov. 12, 1946.   O. C. KOPPEN   2,410,855
SPOILER CONTROL MEANS FOR AIRPLANES
Filed March 15, 1944
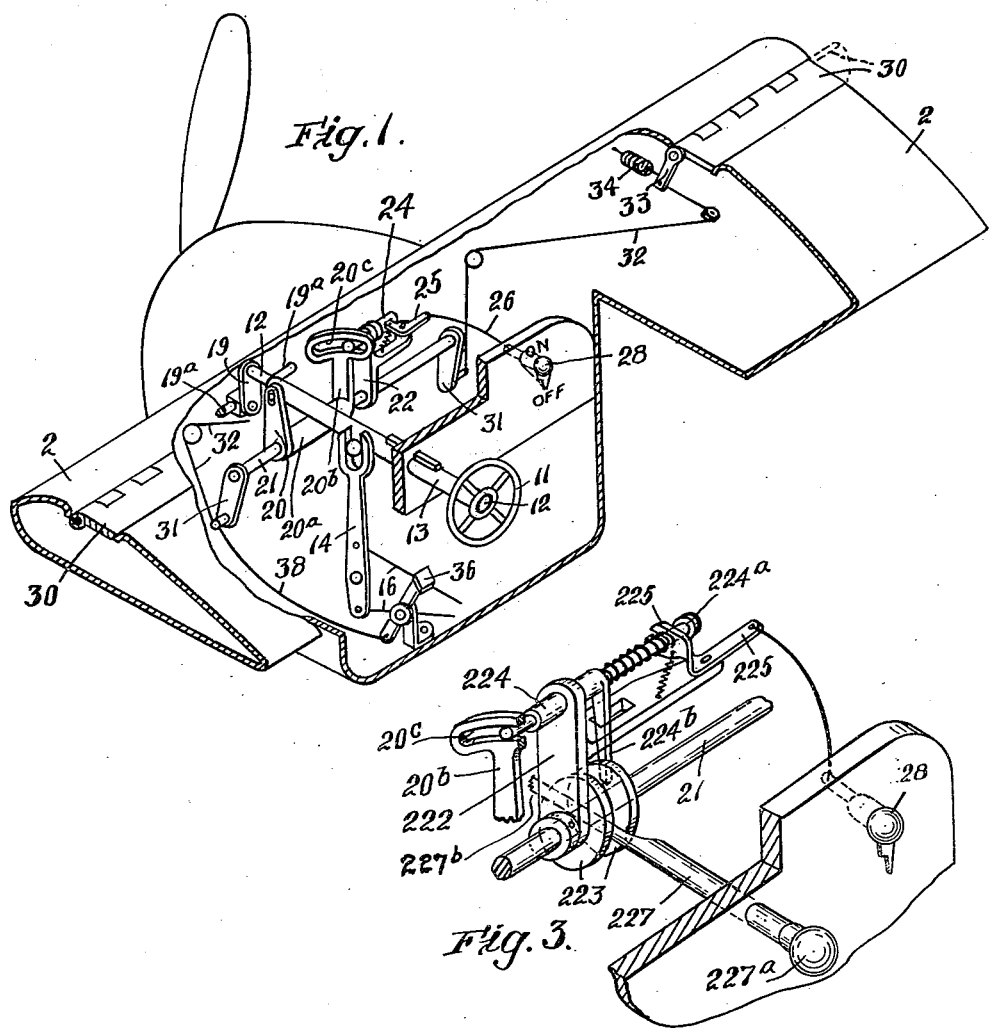
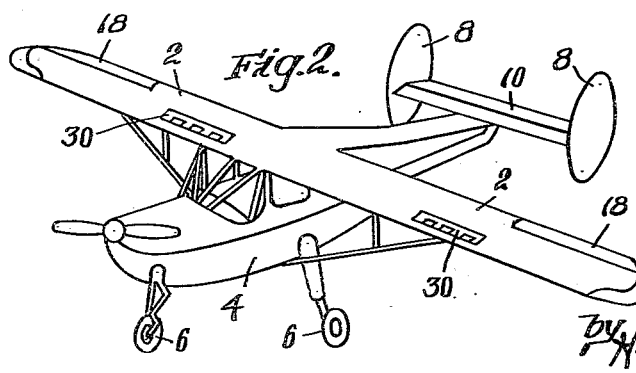
Inventor.
Otto C. Koppen
by H. L. Kirkpatrick
Attorney Patented Nov. 12, 1946

2,410,855

UNITED STATES PATENT OFFICE 2,410,855

SPOILER CONTROL MEANS FOR AIRPLANES

Otto C. Koppen, Newton, Mass.

Application March 15, 1944, Serial No. 526,555

8 Claims. (Cl. 244—42)

This invention relates to airplanes having glide-path-controlling spoilers and has for its general object the provision of new and improved spoiler control means for such airplanes.

In the quest for simpler and safer airplanes, particularly for use by unskilled and inexperienced pilots, spoilers have been introduced as a glide-path control means to steepen and shorten the approach to landing areas by diminishing lift and increasing drag. In making approaches to landing areas, however, a pilot may decide not to land at all and, if he is going to land, frequently has occasion to revise his original decision as to direction and proposed spot of landing, for example, because of change of wind direction, field, or traffic conditions. This, in turn, usually requires that such spoilers, if already extended, be retracted and later extended as the new or modified approach be made, and this in itself may distract a pilot's attention from other things he should be seeing or doing during the landing.

The present invention provides a solution for the problems thus presented by automatic control and actuation of such glide-path-controlling spoilers by reason of their novel combination with the elevator control means, either stick or wheel support, as the case may be. In this way the normal and natural movements of the elevator or other pitch control means can, in turn, properly control the application and retraction of the spoilers without the necessity of any thought or attention on the part of the pilot, thus relieving him during the frequently anxious and always busy moments during landings. In addition to relieving the pilot of the necessity for operating an additional control (for such spoilers) while landing, the invention makes the normal control of the airplane more instinctive and natural. Ordinarily, as in a conventional airplane, or when the glide-path-controlling spoiler is not coupled to the longitudinal or pitch control and the pilot must decide when and how to use it, glidepath control changing the attitude of the airplane is opposite in direction to what the pilot's instincts would indicate, i. e., to flatten the glide-path the nose must be depressed, and to steepen the glide-path, the nose must be raised. Thus, to clear an obstacle, the pilot must point the nose of the airplane at it. This is not an instinctive reaction and consequently one that is difficult to master. However, with a glide-path-controlling spoiler combined with the pitch control, as in the present invention, the flight path will be steepened when the airplane nose is depressed by an elevator movement, and will flatten when the nose is raised by an elevator movement, thus providing a much simpler and safer airplane to land.

In order to further describe my invention, reference is made to the drawing showing preferred embodiments thereof in which:

Fig. 1 is a perspective diagrammatic view illustrating the airplane and control combination of this invention;

Fig. 2 is a perspective view generally and further illustrating the airplane of Fig. 1; and Fig. 3 is a perspective diagrammatic view illustrating a modification of the control combination of Fig. 1.

Though the invention is applicable to any conventional airplane of the three-control type, the type of airplane illustrated in the drawing is a small tricycle gear, rudderless airplane of the two-control type described and claimed in my Patent No. 2,196,994, April 16, 1940, with the addition of spoilers adapted to control the airplane glide-path. Flaps may or may not be used according to landing speed requirements.

The airplane of the drawing (Figs. 1 and 2) includes wings 2, a fuselage or body 4, landing wheels 6 with an empennage including vertical fins 8 and a pitch-control surface, i. e., elevator 10. The elevator is suitably linked to and controlled by a Deperdussin wheel 11 affixed to shaft 12 rotatable (to provide rolling control) within the push-and-pull tube 13 which is slidable through the dash but cannot rotate therein because of its external spline as shown. Thus the push-and-pull movement of the wheel 11 moves the elevator 10 by the mechanism shown through the pivoted elevator control lever 14 or in any suitable manner, as by elevator control wires 16, the ailerons 18 also being controlled by the rotation of the wheel 11 through the shaft 12 and aileron control crank 19 and push rods 19a, shown only in part but which connect to and actuate the ailerons in the conventional manner. The control tube 13 by its fore and aft movement oscillates a crank 20 affixed to tube 20a and rotatably mounted on a transverse shaft 21. The tube 20a also has mounted thereon a lever 20b with a curved slot 20c at the top thereof. The shaft 21 has affixed thereto a spoiler control lever 22 adjacent the lever 20b and through which the lever 22 may be urged forwardly (with reference to the airplane) when the lever 20b with its slot 20c in their forward movement encounter the transversely movable pin 24 mounted at the upper end of the lever 22 (see Fig. 2). This pin is normally spring-biased so as to be extended into the slot 20c of the lever 20b, but by means of the bell-crank 25 and control wire 26, of Bowden type, can be retracted and suitably locked in retracted position by pulling and holding the wire, for example, by a simple two-position knob 28 mounted on the dash which will lock in either spoilers off or spoilers on position, as desired. The glide-path controlling spoilers 30 are extended by the forward movement of the lever 22 through the shaft 21, cranks 31, and control wires 32 running to each spoiler actuating-arm 33, there being a lost-motion effect by virtue of the cranks 31, which upon further forward movement of the lever 22, approach and move into and near a bottom dead-center without further spoiler actuation or undue stress on the spoiler actuation system. The spoilers are retracted by springs 34 (see Fig. 1) as permitted by a slackening of their respective control wires.

In Fig. 3, there is illustrated a modification of that part of the control combination of Fig. 1 having to do with disabling the spoiler control means, the balance of the combination in this case being the same as that illustrated in Figs. 1 and 2. Though this modification of Fig. 3 as shown retains the separate manual control on the dash for disabling the actuation of the spoiler from the pitch control means, such separate manual control may be wholly omitted. The device of Fig. 3 incorporates, however, a safety device whereby possible actuation of the spoiler by the pitch control means is dependent upon throttle position. This prevents undesirable actuation of the spoilers, say, during take-off, when it would be dangerous, as might occur in various circumstances, for example, in correcting for gusts, because of a trim condition, or because of the use of flaps during take-off. To accomplish this advantageous result there is provided a connection between the engine throttle control and the spoiler control means to disable the latter and prevent its operation of the spoiler whenever the engine is throttle-controlled to deliver any given amount of its power, for example, the major portion of its power, e. g., two-thirds or three-quarters power, most take-offs being at full power with the throttle control in wide open position.

To effect this result there may be included the same lever 20b with its slot 20c (see Fig. 3) with a modified form of spoiler control lever 222 on the transverse shaft 21, this lever 222 having at its upper end a transversely movable pin 224 which is normally spring-pressed to the left, as shown in the drawing, by a spring intervening between the shoulder on the pin 224 and the loosely surrounding end of the spring-biased bell-crank lever 225. The latter is prevented from being forced off the end of the pin by means of the projection 224a at the right end of the pin, as shown. The pin also has a downward extension freely sliding in an aperture in the sidewise projecting shelf of the lever 222, the extension terminating just short of the shaft 21 and outside the right hand of two disks 223 which are slidable thereon, though normally pressed together and towards the lever 222 by the spring urging the pin 224 towards the left. Between these disks the throttle control rod 227 extends, one end of the throttle control rod passing through the dash to the knob 227a and the opposite end 227b being connected to or controlling the engine throttle valve. This rod is of varying cross-section adjacent the disks 223 so as to provide a longitudinal slidable cam (in accordance with the throttle control position) so that whenever the throttle control is sufficiently opened (pressed forwardly) that the engine is delivering the major portion of its power, the right-hand disk 223, and with it the extension 224b and pin 224, are moved to the right so as to withdraw the pin 224 from the slot 20c of the lever 20b. This mechanism thus provides a safety device preventing actuation of the spoilers due to a forward "stick" movement at an inopportune time during take-off, and even though the knob 28 connecting the bell-crank 225 is in its spoilers on position because the cam action and intervening thick portion of the throttle rod blocks any attempted entrance of the pin 224 into the slot 20c, or withdraws said pin therefrom if it is already in said slot.

The spoiler control means is preferably organized and adjusted so that the spoilers are completely extended during but a slight forward movement (say 6 to 8°) of stick movement or of the elevator control-lever 14 from the position it occupies at a normal glide condition of the airplane in flight. This enables the pilot to put the airplane into a normal glide (power off or with power much reduced) from the usual cruising speed and condition and then, when he wishes to shorten his glide, by a further forward movement of the wheel, extend the spoilers. The said wheel and control-lever movement of the elevator also depresses the nose of the airplane downwardly until the desired steepening of the glide-path is no longer necessary or desired, whereupon, as the pilot nears the ground and pulls the wheel and elevator control-lever back to the position of a normal glide, the spoilers are simultaneously meanwhile retracted by the springs, thus permitting him to flatten and "flare out" his glide path upon the wings resuming their unspoiled lift for the particular then-existing air-speed.

It will be seen from the foregoing that an unskilled pilot need pay no attention whatever to the actuation of the glide-path-controlling spoilers but, instead, may simply fly the airplane normally and, in a normal approach, through his natural, instinctive and customary elevator-controlling movements of the stick or wheel, safely and surely automatically apply and retract the spoilers as needed. For many approaches the spoilers will not be used at all, particularly in large fields, unless the pilot wishes to land "short."

The airplane can be flown in all ordinary take-off and landing maneuvers with the spoilers connected for automatic actuation (as is preferred), though, should the pilot for any reason, such as stunting or other practice work, desire to disable the automatic actuation of the spoilers, that can be readily optionally accomplished by locking them out of automatic action by moving the knob 28 to its spoilers "off" position. Also, in some airplanes built for instruction or other special purposes, it may be desired directly to apply and retract the spoilers, and, if so, this can be done by operation of a separate means, hand or foot-operated as desired. Preferably, this is done through a foot pedal 36 which is connected through a cable 38 into the spoiler control system so that they can be actuated as desired. There may also be provided a catch (not shown) to releasably lock the foot pedal in its forward or spoilers extended position which is useful in parking of the airplane on the ground so as to minimize wing lift and movement when the airplane is headed into the wind.

Though the invention has been described in connection with a powered airplane having a tail and elevator, the principles thereof are applicable to other classes of fixed wing aircraft of the heavier-than-air type, for example, to gliders, and to tailless aircraft which have other pitch control surfaces than the conventional elevator pitch-control surface shown and described herein, and it is intended that claims hereof, insofar as their language permits, include various sorts of pitch control surfaces. In any of such aircraft a single centrally located glide-path-control spoiler may be substituted for the multiple spoilers as shown herein, though, in such case, if below the fuselage, it functions primarily to increase drag.

This application is a continuation-in-part of my application Ser. No. 518,543, filed January 17, 1944.

Having described my invention, I claim:

1. A fixed-wing aircraft having, in combination, a body, supporting wings, a pitch-control tail surface, a manually-operated fore and aft movable pitch-control means for said pitch-control surface, said pitch-control means being operative to depress said surface upon a forward movement of said control means and to elevate said surface upon a rearward movement of said control means, a glide-path-controlling spoiler, and spoiler control means including a mechanical connection between said spoiler and said pitch-control means operative to extend the spoiler and steepen the glide-path by a nose-depressing forward movement of said pitch-control means and to retract the spoiler thereby flattening the glide-path by subsequent nose-elevating rearward movement thereof.

2. A fixed-wing aircraft having, in combination, a body, supporting wings, a pitch-control tail surface, a manually-operated fore and aft movable pitch-control means for said pitch-control surface, said pitch-control means being operative to depress said surface upon a forward movement of said control means and to elevate said surface upon a rearward movement of said control means, a glide-path-controlling spoiler, and spoiler control means including a mechanical connection between said spoiler and said pitch-control means operative to extend the spoiler and steepen the glide-path by a nose-depressing forward movement of said pitch-control means beyond the position of a normal glide and to retract the spoiler thereby flattening the glide-path by subsequent nose-elevating rearward movement thereof.

3. A fixed-wing aircraft having, in combination, a body, supporting wings, a pitch-control tail surface, a manually-operated fore and aft movable pitch-control means for said pitch-control surface, said pitch-control means being operative to depress said surface upon a forward movement of said control means and to elevate said surface upon a rearward movement of said control means, a glide-path-controlling spoiler, and spoiler control means including a mechanical connection between said spoiler and said pitch-control means operative to extend the spoiler and steepen the glide-path by a nose-depressing forward movement of said pitch-control means beyond the position of a normal power-off glide and to retract the spoiler thereby flattening the glide-path by subsequent nose-elevating rearward movement thereof.

4. A fixed-wing aircraft having, in combination, a body, supporting wings, a pitch-control tail surface, a manually-operated fore and aft movable pitch-control means for said pitch-control surface, said pitch-control means being operative to depress said surface upon a forward movement of said control means and to elevate said surface upon a rearward movement of said control means, a glide-path-controlling spoiler, and spoiler control means including a mechanical connection between said spoiler and said pitch-control means operative to extend the spoiler and steepen the glide-path by a nose-depressing forward movement of said pitch-control means and to retract the spoiler thereby flattening the glide-path by subsequent nose-elevating rearward movement thereof, and a separately independently operable spoiler control means for direct manual operation thereof.

5. A fixed-wing aircraft having, in combination, a body, supporting wings, a pitch-control tail surface, a manually-operated fore and aft movable pitch-control means for said pitch-control surface, said pitch-control means being operative to depress said surface upon a forward movement of said control means and to elevate said surface upon a rearward movement of said control means, a glide-path-controlling spoiler, and an optionally-engageable spoiler control means including a mechanical connection between said spoiler control means and said pitch-control means operative to extend the spoiler and steepen the glide-path by a nose-depressing forward movement of said pitch-control means and by subsequent nose-elevating rearward movement thereof to retract the spoiler thereby flattening the glide-path.

6. A fixed-wing aircraft having, in combination, a body, an engine with a manually operated throttle control, supporting wings, a pitch-control tail surface, a manually-operated fore and aft movable pitch-control means for said pitch-control surface, said pitch-control means being operative to depress said surface upon a forward movement of said control means and to elevate said surface upon a rearward movement of said control means, a glide-path-controlling spoiler, and spoiler control means including a mechanical connection between said spoiler and said pitch-control means operative to extend the spoiler and steepen the glide-path by a nose-depressing forward movement of said pitch-control means and by subsequent nose-elevating rearward movement thereof to retract the spoiler thereby flattening the glide-path, and a connection between said throttle control and said spoiler control means to disable the latter and prevent its operation of said spoiler whenever the engine is delivering the major portion of its power.

7. A fixed-wing aircraft having, in combination, a body, an engine with a manually-operated throttle control, supporting wings, a pitch-control tail surface, a manually-operated fore and aft movable pitch-control means for said pitch-control surface, said pitch-control means being operative to depress said surface upon a forward movement of said control means and to elevate said surface upon a rearward movement of said control means, a glide-path-controlling spoiler, and spoiler control means including a mechanical connection between said spoiler and said pitch-control means operative to extend the spoiler and steepen the glide-path by a nose-depressing forward movement of said pitch-control means beyond the position of a normal glide and by subsequent nose-elevating rearward movement thereof to retract the spoiler thereby flattening the glide-path, and a connection between said throttle control and said spoiler control means to disable the latter and prevent its operation of said spoiler whenever the engine is delivering the major portion of its power.

8. A fixed-wing aircraft having, in combination, a body, an engine with a manually-operated throttle control, supporting wings, a pitch-control tail surface, a manually-operated fore and aft movable pitch-control means for said pitch-control surface, said pitch-control means being operative to depress said surface upon a forward movement of said control means and to elevate said surface upon a rearward movement of said control means, a glide-path-controlling spoiler, and spoiler control means including a mechanical connection between said spoiler and said pitch-control means operative to extend the spoiler and steepen the glide-path by a nose-depressing movement of said pitch-control means beyond the position of a normal power-off glide and by subsequent nose-elevating rearward movement thereof to retract the spoiler thereby flattening the glide-path, and a connection between said throttle control and said spoiler control means to disable the latter and prevent its operation of said spoiler whenever the engine is delivering the major portion of its power.

OTTO C. KOPPEN.